UNITED STATES PATENT OFFICE.

RANDALL FISH, OF WASHINGTON, DISTRICT OF COLUMBIA, ASSIGNOR TO HIMSELF AND CHARLES D. GILMON, OF SAME PLACE.

IMPROVED FERTILIZER.

Specification forming part of Letters Patent No. 92,810, dated July 20, 1869.

*To all whom it may concern:*

Be it known that I, RANDALL FISH, of Washington, in the county of Washington and District of Columbia, have invented a new and valuable Improvement in Fertilizers; and I do hereby declare that the following is a full, clear, and exact description of the same.

My invention relates to fertilizers; and it consists mainly in a novel compound of substances, intended to serve as efficient means for the purposes mentioned.

My fertilizer is composed of the substances following—that is to say, of night-soil, marl, peat-ashes, charcoal of wood or peat, copperas, salt, tobacco, gypsum, tincture of almonds, tincture of coffee, and coffee-grounds.

I ordinarily compound these ingredients in the following proportions, namely: In sixty-five pounds of night-soil, I add seventeen and a half pounds of dry marl, eleven and a half pounds of ashes, made from peat, and six pounds of charcoal, from peat or wood, or both combined, from three to six ounces of tobacco, from two to six quarts of gypsum, one ounce tincture of almonds, well saturated, from one to two quarts saturated solution of copperas, and a small quantity of tincture of coffee or coffee-grounds. I also add one quart of chloride of sodium.

In the above-described compound the proportions given are not absolutely indispensable. They may be changed somewhat without lessening the value of the fertilizer, and I find it serves an efficient purpose in cases where some of the ingredients are left out, as, for instance, the tincture of almonds and coffee, or coffee-grounds.

My means for compounding the above-named substances and preparing the fertilizer for market consist of machinery, for which I am about to make application for Letters Patent. I therefore omit a description thereof in this specification.

What I claim as my invention, and desire to secure by Letters Patent, is—

The fertilizer herein described, compounded of the ingredients named, substantially as specified.

In testimony that I claim the above I have hereunto subscribed my name in the presence of two witnesses.

RANDALL FISH.

Witnesses:
 JAMES P. GREVES,
 SAMUEL M. THATCHER.